United States Patent [19]

Nicholas et al.

[11] Patent Number: 4,996,104

[45] Date of Patent: Feb. 26, 1991

[54] TEMPERATURE-SENSITIVE MATERIALS AND DEVICES

[75] Inventors: Beatrice M. Nicholas, Tring; Alan Mosley, Berkhamsted; Cyril Hilsum, Pinner; Michael G. Clark, Gerrards Cross, all of England

[73] Assignee: The General Electric Company, p.l.c., England

[21] Appl. No.: 327,559

[22] Filed: Mar. 23, 1989

Related U.S. Application Data

[63] Continuation of Ser. No. 61,701, Jun. 12, 1987, abandoned.

[30] Foreign Application Priority Data

Jun. 18, 1986 [GB] United Kingdom ............... 8614839

[51] Int. Cl.$^5$ ............................................. G01K 11/06
[52] U.S. Cl. .................................. 428/323; 428/402.2; 374/106; 374/160; 374/210; 252/962
[58] Field of Search ........... 428/402.2, 402.21, 402.22, 428/402.24, 323; 73/432.1, 866.3; 374/159, 160, 162, 210; 252/962

[56] References Cited

U.S. PATENT DOCUMENTS

| | | | |
|---|---|---|---|
| 4,382,700 | 5/1983 | Youngren | 374/102 |
| 4,643,588 | 2/1987 | Postle et al. | 374/160 |
| 4,753,188 | 6/1988 | Schmoegner | 116/217 |

FOREIGN PATENT DOCUMENTS

| | | |
|---|---|---|
| 0138741 | 4/1985 | European Pat. Off. . |
| 2349824 | 11/1977 | France . |
| 1481100 | 7/1977 | United Kingdom . |
| 1545065 | 5/1979 | United Kingdom . |
| 2051361 | 1/1981 | United Kingdom . |
| 2155633 | 9/1985 | United Kingdom . |
| 2168147 | 6/1986 | United Kingdom . |

Primary Examiner—George F. Lesmes
Assistant Examiner—Christopher Brown
Attorney, Agent, or Firm—Kirschstein, Ottinger, Israel & Schiffmiller

[57] ABSTRACT

A device for indicating whether a rise in temperature above a predetermined value has occurred includes a support member, such as a label, on which a temperature-sensitive material is deposited. The material includes a large number of fracturable microcapsules containing a medium which changes from a solid state to a liquid state at the predetermined temperature value. The viscosity of the medium in its liquid state and the material of the support member are chosen such that the distance $d_1$ by which the medium flows across the support member after the fracturing of the microcapsules so as to activate the device is indicative of the time between activation of the device and cooling of the device to below the predetermined temperature value. If the temperature is subsequently allowed to rise above the predetermined value, the medium will again assume its liquid state and will flow further across the support member, reaching a distance of, say, $d_2$, thus indicating that the rise in temperature has occurred. The material may be printed on the label as a bar code, so that any rise above the predetermined temperature level will be indicated by distortion of the bar code which renders it unreadable.

18 Claims, 1 Drawing Sheet

TEMPERATURE-SENSITIVE MATERIALS AND DEVICES

This is a continuation of application Ser. No. 07/061,701 filed Jun. 12, 1987, now abandoned.

BACKGROUND OF THE INVENTION

1. Field of the Invention

This invention relates to printing materials, and devices incorporating such materials, for indicating changes in temperature, and particularly for indicating whether a rise in temperature above a predetermined value has taken place.

2. Description of Related Art

Temperature-sensitive devices are required, for example, for monitoring the storage of commodities such as drugs, food-stuffs, and chemicals. In such an application the device is typically attached to the stored commodity, and is required to indicate whether the. temperature of the commodity has risen above a predetermined temperature at any time since the device was attached to the commodity.

In our copending British Patent Application No: 8526680 there is disclosed a device for indicating a rise in temperature above a predetermined value, comprising a quantity of a material which changes from a solid state to a liquid state at the predetermined temperature value, the material being contained in a fracturable enclosure. In use, the device is attached to the commodity the temperature of which must be maintained below the predetermined temperature value, and is activated by the fracturing of the enclosure by pressure applied from outside the enclosure after the device has reached a temperature below the predetermined temperature value. Any subsequent increase in temperature of the device above the predetermined temperature value will cause the material to become liquid, so that it flows out of the previously-fractured enclosure, and causes a detectable change in the device which is not reversed by subsequent reduction of the temperature of the device below the predetermined value.

Such a device, and method of using the device, suffers from the disadvantage, however, that the enclosure must be fractured after the device has reached a temperature below the predetermined temperature. Where, in a typical application, the device is attached to such a commodity as frozen meat for sale in a supermarket, in a typical packaging process the meat prior to freezing is packed in a suitable wrapping material, and labelled with a label containing information such as the weight, price and sell-by date of the meat. It would be particularly convenient if a material for indicating a rise in temperature above a predetermined value at which the frozen meat would spoil could be incorporated into such a label, and if the material were activated as the label is dispensed. It is clear that a device as described in British Patent Application No: 8526680 could not be used in this way. Furthermore, the problem also arises that there is typically a delay of up to two hours before the packaged and labelled meat is placed in a deep freeze in order to reduce its temperature.

SUMMARY OF THE INVENTION

It is an object of the present invention to provide a printing material and a device for indicating changes in temperature, which can be used, for example, in the packaging process hereinbefore described.

According to a first aspect of the invention there is provided a device for indicating a rise in temperature above a predetermined value, comprising a support member; and a temperature-sensitive material deposited on the support member, the temperature sensitive material comprising a quantity of microcapsules containing a first medium which changes from a solid state to a liquid state at said predetermined temperature value, the microcapsules being fracturable to activate the device by application of external pressure thereto when the first medium is in its liquid state; wherein the viscosity of the first medium within its liquid state and a characteristic of the support member are chosen such that the distance which the first medium flows across the support members from its place of deposition thereon after fracture of the microcapsules is indicative of the time elapsing between activation of the device and cooling of the device below said predetermined temperature value; wherein a detectable change is produced in the device if the temperature of the device rises above the predetermined temperature value after said cooling; and wherein the detectable change is not reversed by subsequent reduction of the temperature of the device below the predetermined value.

The support member may comprise a porous material, or alternatively a glazed material.

In one particular device in accordance with the invention the detectable change is the flow of the first medium across the support member beyond the distance flowed before the cooling of the device.

In another particular device in accordance with the invention, the device includes a second medium separated from the place of deposition of the temperature sensitive material by a distance greater than the distance which the first medium flows across the support member before said cooling, the second medium when mixed with the first medium in its liquid state producing the detectable change.

In such devices the second medium preferably incorporates a solid which dissolves in the first medium to form a eutectic mixture which has a melting point below the predetermined value.

The second medium is preferably enclosed in microcapsules which are fracturable by application of external pressure thereto during activation of the device.

The first medium may incorporate a first dye of a first colour, and the second medium may incorporate a second dye of a second colour, the first and second dyes mixing to produce a third colour.

According to a second aspect of the invention there is provided a method of indicating a rise in temperature of an article above a predetermined value, comprising attaching a device as defined above to the article; fracturing the microcapsules by application of external pressure thereto whilst the temperature of the device is above the predetermined value; cooling the article and the device below the predetermined value; and subsequently detecting whether the medium has thereafter risen above the predetermined temperature.

BRIEF DESCRIPTION OF THE DRAWINGS

Embodiments of the invention will now be described, by way of example only, with reference to the accompanying drawing in which.

DETAILED DESCRIPTION OF THE PREFERRED EMBODIMENTS

Figure 1:
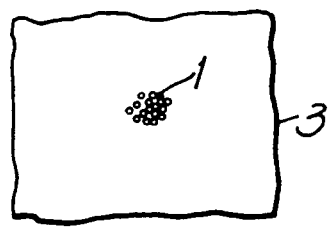
FIG. 1 is a schematic plan view of a first temperature-sensitive device before activation.

Referring to FIG. 1, a first device comprises a large number of microcapsules 1 printed in the form of a dot on to a porous material, for example a piece of paper 3, using a suitable technique such as ink-jet printing. The diameter of each microcapsule lies within a range of, for example, 1 to 50 microns, the preferred range being 5 to 10 microns. Each microcapsule contains a temperature-sensitive material comprising a mixture of dodecane and a small, approximately 0.5%, amount of a dye, the dodecane having a melting point of $-10°$ C. and therefore being liquid at room temperature. The microcapsules are suitably formed of gelatine, or other microencapsulant material. The piece of paper 3 will generally form part of a label to be applied to an article, such as a piece of wrapped meat which is to be frozen and subsequently stored in a frozen condition.

Figure 2:
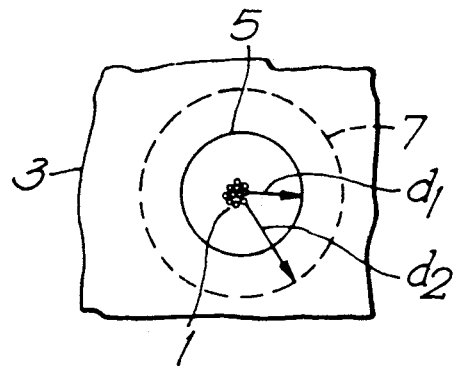
FIG. 2 is a schematic plan view of the device of FIG. 1 after activation.

In use of the device, the label is attached to the piece of meat (not shown) during which process pressure is applied to the microcapsules such that they rupture, releasing their contents. The dodecane/dye mixture will then start to flow through the paper 3, staining the paper and indicating that the device has been activated. This flow will continue until the piece of meat carrying the label is placed in a refrigeration system and the temperature of the device is reduced below $-10°$ C., at which point the dodecane will solidify, and stop flowing. The viscosity of the contents of the microcapsules 1 and the form of the paper 3 are chosen such that in the time period elapsing between the rupture of the microcapsules and the point at which the temperature of the device goes below $-10°$ C. the contents of the microcapsules will not have spread over the whole of the paper 3. In this period they will, however, have spread over a generally circular area 5 of radius $d_1$ centered on the original printed spot, as indicated in FIG. 2, this radius $d_1$ being predictable from the viscosity of the contents and the form of the paper. Should any subsequent rise in temperature of the device above $-10°$ C. take place, for example due to a power cut in the electrical supply to the refrigeration system, the contents of the microcapsules will again start to flow through the paper 3, further staining the paper. Hence, by the presence of a larger stained area on the paper 3 than the circle of radius $d_1$, an indication is given that such a temperature rise has taken place. An area defined by a circle of radius $d_2$ as shown in FIG. 2 may be established as a threshold for permissible combinations of temperature rises and time periods during which such rises take place, before the meat must be regarded as 'spoiled' and unfit for consumption.

Figure 3:
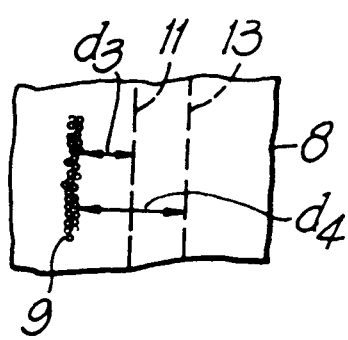
FIG. 3 is a schematic plan view of a second device before activation.

Referring now to FIG. 3, in an adaption of the device described above, the microcapsules containing the dodecane/dye mixture may be printed in the form of a stripe 9 on a piece of porous paper 8. A line 11 separated from the stripe 9 by a distance $d_3$ may be established, corresponding to the distance my which the material contained in the microcapules will flow in the time period elapsing between the rupture of the microcapsules and the reduction of the temperature of the device to $-10°$ C. A further line 13, separated from the stripe 9 by a larger distance $d_4$ may also be established, defining the threshold for 'spoiling' of the article carrying the device, analogously to the first device.

Figure 4:
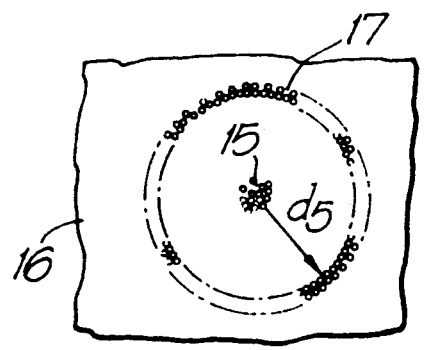
FIG. 4 is a schematic plan view of a third device before activation.

Referring now to FIG. 4, the third device to be described includes two sets of microcapsules, the first set 15 containing a mixture of dodecane and a small amount of dye as before, the dye being, for example, yellow. The second set of microcapsules 17 contains Eicosane, which has a melting point of about 37° C. and is therefore solid at room temperatures, and a small amount of a dye of a different colour from that contained in the first set of microcapsules, for example cyan. The first set of microcapsules 15 is printed in the form of a dot, as before, on a piece of porous material 16, whilst the second set of microcapsules 17 is printed in the form of a ring centered on the dot. As before, the material 16 will typically form part of a label to be applied to a commodity, such as meat which is to be frozen and then stored in a frozen state.

During application of the label to the meat, both sets of microcapsules 15 and 17 will be ruptured. As this process will be carried out at room temperature, the contents of the first set of microcapsules 15 will start to flow through the material 16, indicating activation of the device, whilst the Eicosane contained within the second set of microcapsules 17 will be solid and consequently will not flow. The spacing of the microcapsules 17 from the microcapsules 15 is chosen such that the meat will normally have been placed in a refrigeration system and cooled to below $-10°$ C. before the contents of the microcapsules 15 reach the microcapsules 17. If, however, the meat is not cooled to below this temperature in time, or after freezing it is subsequently allowed to rise above $-10°$ C., the contents of the microcapsules 15 will reach the contents of the microcapsules 17, and will start to dissolve the Eicosane. A eutectic mixture will thus be formed which will not refreeze. At the same time, the yellow dye contained within the microcapsules 15 will mix with the cyan dye contained within the capsules 17, to form a green dye. This will spread over the material 16 indicating that the meat is spoiled.

Figure 5:
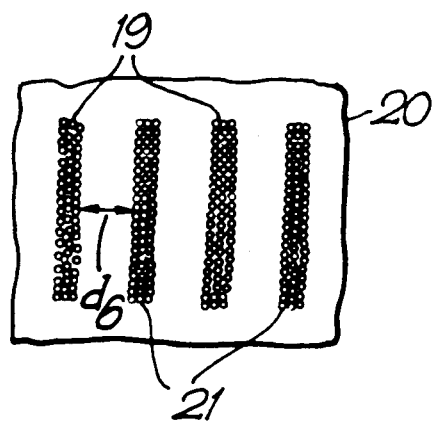
FIG. 5 is a schematic plan view of a fourth device before activation.

Referring to FIG. 5, this figure shows an adaptation of the device of FIG. 4, in which stripes 19 of microcapsules are printed on a porous piece of paper 20, these microcapsules containing an ink comprising a mixture of dodecane and a dye of a first colour. Between the stripes 19, the spaced therefrom by a distance $d_6$, are printed stripes 21 of microcapsules containing an ink comprising a mixture of Eicosane and a dye of a second colour. Use of this device is analogous to that of the device described with reference to FIG. 4.

Figure 6:
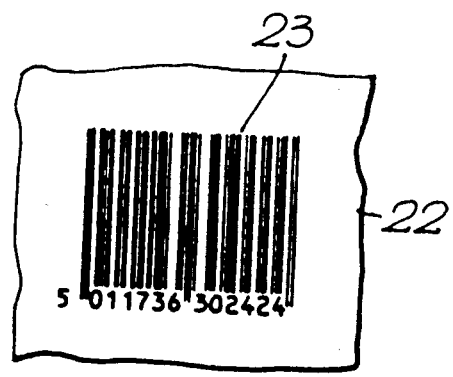
FIG. 6 is a schematic plan view of a fifth device before activation.

FIG. 6 shows part of a label 22 including a bar code 23 of a type which is very commonly applied to foodstuffs and other commodities, in particular for use in automatic checkouts of supermarkets. A code reader at the checkout automatically reads the code as the goods are passed across a reading position, and devices thereform such details as price and description of the goods, which are then printed on the checkout receipt which is subsequently issued to the customer. If the code reader cannot correctly decipher the bar code, it will operate an indicator, and special action must be taken by the checkout operator. If such a bar code is printed using microcapsule material as described above, and the label is applied to a package of food which is subsequently frozen, any significant rise in temperature which occurs thereafter will allow the dye to flow, thereby distorting the bar code and rendering it indecipherable by the code reader.

It will be appreciated that whilst in all of the devices described above by way of example, the material on which printing by the microcapsule material is affected is a porous material, in alternative devices in accordance with the invention the microcapsules may be printed on a glazed material, for example a plastics material or a varnish. The content of the microcapsules when ruptured will then flow across the surface of the material.

It will also be appreciated that the choice of materials which are enclosed within the microcapsules will be determined by the particular predetermined datum temperature.

Furthermore, whilst the devices described above exhibit the required 'time delay' enabling a period to elapse between activation of the device and cooling of the device below the predetermined temperature, a further advantage of the devices in accordance with the invention over those described in British patent application No: 8526680 is that a visible indication is obtained of the time elapsing during which the device is above the predetermined temperature after activation of the device. This will be the case even if the temperature of the device does not rise above the predetermined temperature after it has first been cooled below this temperature.

We claim:

1. A temperature-sensitive device for monitoring a commodity to determine whether a total amount of time during which the commodity has been subjected to a temperature exceeding a predetermined temperature value is greater than an acceptable amount, the device comprising: a support member on which is deposited by printing at a first position a quantity of fracturable microcapsules containing a temperature-sensitive colored first medium which has a liquid state above said predetermined temperature value and which changes to a solid state at said predetermined temperature value; said microcapsules being fracturable while the medium is at a temperature above said predetermined temperature value to activate said device so that said colored first medium flows across the support member by a first distance forming a colored region having a size which is dependent upon a period of time elapsing between activation of the device and reduction of the temperature of the commodity below said predetermined value; said first medium responding to any subsequent rise in temperature above said predetermined temperature value by flowing further across said support member, thereby enlarging the colored region, which region provides a permanent irreversible indication as to whether said acceptable total amount of time has been exceeded.

2. A device as claimed in claim 1, wherein said support member comprises a porous material.

3. A device as claimed in claim 1, wherein said support member comprises a glazed material.

4. A device as claimed in claim 1, wherein a second medium is deposited at a second position on said support member, said second position being spaced away from said first position by a spacing greater than an acceptable magnitude of said first distance; and wherein said second medium mixes with said colored first medium in its liquid state, to enhance said indication.

5. A device as claimed in claim 4, wherein said second medium includes a solid which is soluble in said colored first medium in its liquid state to form a eutectic mixture having a melting point below said predetermined temperature value.

6. A device as claimed in claim 4, wherein said second medium is contained in an additional quantity of microcapsules which are fracturable by application of external pressure thereto during the activation of the device.

7. A device as claimed in claim 4, wherein said colored first medium includes a first dye of a first color; wherein said second medium includes a second dye of a second color; and wherein said first and second dyes produce a third color when mixed.

8. A device as claimed in claim 1, wherein said colored first medium comprises a mixture of dodecane and a dye, and wherein said predetermined temperature value is of the order of $-10°$ C.

9. A temperature-sensitive device for monitoring a commodity to determine whether a total amount of time during which said commodity has been subjected to a temperature exceeding a predetermined temperature value is greater than an acceptable amount, the device comprising: a support member on which is deposited by printing a quantity of fracturable microcapsules containing a temperature-sensitive colored medium which has a liquid state above said predetermined value and which changes to a solid state at said predetermined value; said microcapsules being fracturable to release the medium while the medium is at a temperature above said predetermined value; said microcapsules being so deposited that data-representing markings are produced on the support member by the released medium and said released medium thereafter flows across the support member by a distance which is dependent upon the amount of time elapsing between fracturing of said microcapsules and reduction of the temperature of the commodity below said predetermined value and upon any subsequent amount of time during which the temperature of the commodity is above said predetermined value, whereby if said total amount of time is greater than said acceptable amount, said data-representing markings are rendered illegible.

10. A device as claimed in claim 9, wherein said data-representing markings are in the form of a bar-code representing details of said commodity.

11. A device as claimed in claim 9, wherein said colored medium comprises a mixture of dodecane and a dye, and wherein said predetermined temperature value is of the order of $-10°$ C.

12. A pressure-activated device for indicating a rise in temperature above a predetermined temperature value, comprising:

(a) a support member;

(b) a quantity of microcapsules deposited at a first place of deposition on the support member, said microcapsules containing a temperature-sensitive, colored first medium which changes from a solid state to a liquid state at said predetermined temperature value, said microcapsules being fracturable to activate the device by application of external pressure thereto when the colored first medium is in its liquid state;

(c) said colored first medium in its liquid state flowing across the support member over a first distance outwardly away from said first place of deposition after fracture of the microcapsules to produce a first colored region on the support member;

(d) said first distance being indicative of a time interval elapsing between activation of the device and subsequent cooling of the device below said predetermined temperature value;

(e) said colored first medium in its liquid state, when the temperature has risen above said predetermined value after said cooling, again flowing across the support member over a second distance outwardly away from said first colored region to produce a second enlarged colored region on the support member;

(f) said second enlarged colored region serving as a permanent indicator and being irreversible in the event of subsequent reduction of the temperature of the device below said predetermined temperature value; and (g) a second medium deposited at a second place of deposition on the support member, said second place of deposition being spaced away from said first place of deposition by a spacing greater than said first distance, said second medium including a solid dissolvable in the colored first medium in its liquid state to form a eutectic mixture having a melting point below said predetermined temperature value, said second medium mixing with the colored first medium in its liquid state to produce said permanent indicator.

13. The device according to claim 12, wherein the support member is a porous sheet.

14. The device according to claim 12, wherein the support member is a glazed sheet.

15. The device according to claim 12, wherein the second medium is contained in an additional quantity of microcapsules fracturable by application of external pressure thereto during the activation of the device.

16. The device according to claim 12, wherein the colored first medium includes a first dye of a first color; wherein the second medium includes a second dye of a second color; and wherein the first and second dyes produce a third color when mixed.

17. The device according to claim 12, wherein the support member is a label for attachment to an article subject to temperature variations, and wherein the microcapsules are deposited at the first place of deposition in the form of a bar code symbol indicative of the article.

18. The device according to claim 12, wherein the colored first medium includes a mixture of dodecane and a dye, and wherein the predetermined temperature value is on the order of $-10°$ C.

* * * * *